US006937301B2

(12) United States Patent
Sekiguchi et al.

(10) Patent No.: US 6,937,301 B2
(45) Date of Patent: Aug. 30, 2005

(54) TIME PIECE WITH POWER GENERATION FUNCTION

(75) Inventors: Kanetaka Sekiguchi, Sayama (JP); Masafumi Ide, Tokorozawa (JP); Takashi Akiyama, Sayama (JP); Masami Kikuchi, Kodaira (JP); Yuichi Akiba, Tokorozawa (JP); Koji Nakagawa, Hachioji (JP); Koichi Hoshino, Omiya (JP); Takashi Toida, Tokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 383 days.

(21) Appl. No.: 10/122,364

(22) Filed: Apr. 16, 2002

(65) Prior Publication Data

US 2002/0109808 A1 Aug. 15, 2002

Related U.S. Application Data

(63) Continuation of application No. 09/254,842, filed as application No. PCT/JP98/03255 on Mar. 15, 1999.

(30) Foreign Application Priority Data

Jul. 18, 1997 (JP) .............................................. 9-194053
Jul. 30, 1997 (JP) .............................................. 9-204414

(51) Int. Cl.⁷ ............................................ G02F 1/1335
(52) U.S. Cl. ............................ 349/96; 349/97; 349/98; 349/114; 349/115
(58) Field of Search ...................... 349/96–98, 113–115, 349/117, 142; 368/84, 242; 359/494, 498

(56) References Cited

U.S. PATENT DOCUMENTS 4,240,021 A * 12/1980 Kashima et al. ............ 320/101
4,241,339 A    12/1980 Ushiyama ................... 340/702
4,413,915 A    11/1983 Besson ......................... 368/71
4,545,648 A    10/1985 Shulman et al. ............ 350/337
5,455,808 A    10/1995 Grupp et al. ................. 368/82
5,740,130 A     4/1998 Grupp et al. ................. 368/82
5,742,367 A *   4/1998 Kozaki ........................ 349/64
5,880,800 A     3/1999 Mikura et al. .............. 349/117
5,899,551 A     5/1999 Neijzen et al. ............. 349/115
6,111,696 A *   8/2000 Allen et al. ................. 359/495
6,295,108 B1 *  9/2001 Kaneko ....................... 349/115
6,417,903 B1 *  7/2002 Kaneko ....................... 349/117

FOREIGN PATENT DOCUMENTS

| GB | 2 179 768 A | 3/1987 |
| JP | 55-132970   | 10/1980 |
| JP | 56-36079    | 4/1981 |
| JP | 60-80374    | 6/1985 |

* cited by examiner

Primary Examiner—Jeffrey Pwu
(74) Attorney, Agent, or Firm—Westerman, Hattori, Daniels and Adrian LLP

(57) ABSTRACT

A watch unit having a time-displaying section, including a reflection-type polarizing film 14 disposed on an upper portion or a lower portion of the time-displaying section or a portion comprising a part of the time-displaying section, an optical modulation section which varies the ratio of a transmission axis to a reflection axis of the reflection-type polarizing film 14, and a shutter function to shield a portion of or all of the watch unit having the time-display section by varying the reflection intensity and the transmission intensity in relation to the light incident direction using the reflection-type polarinzing film 14 and the optical modulation section, to enhance the appearance and to improve the versatility of the watch unit.

9 Claims, 14 Drawing Sheets

(a)

(b)

(c)

(d)

(e)

(f)

TIME PIECE WITH POWER GENERATION FUNCTION

This application is a continuation of prior application Ser. No. 09/254,842 filed Mar. 15, 1999 which is a 371 of PCT/JP98/0325 filed on Jul. 21, 1998, and which is hereby incorporated by reference.

TECHNICAL FIELD

The present invention relates to a timepiece (watch and clock) which displays time information such as hours, minutes, and seconds, calendar information such as date, day-of-the week, month, and year in digital form, using a liquid crystal panel, and time information using an hour hand, a minute hand, a second hand, and the like in an analog fashion.

BACKGROUND ART

A timepiece which displays time information such as hours, minutes, and seconds, and calendar information such as date, day-of-the week, month, and year using a liquid crystal display panel has been widely used in a wrist watch or a table clock which is equipped with a crystal oscillator circuit.

When time information or calendar information is to be displayed in digital form using the liquid crystal display, a predetermined display is performed by disposing an upper polarizing film and lower polarizing film on the top and bottom of the liquid crystal cell and utilizing a quality of a liquid crystal wherein an optical characteristic of the liquid crystal is changed when an electric field is applied.

Further, in the field concerning table clocks and wall clocks, a mechanism clock equipped with a decorative doll and the like which exhibits various movements at a predetermined time, and a clock which is combined with a liquid crystal display device, and exhibits various movements made by animals and the like at a predetermined time or at a user-adjusted time, have been developed. Therein, appearance and versatility are a matter of importance.

A motion such as an opening and closing of a screen is mechanically conducted at present to reveal the motions of a doll or the like to the viewer at a predetermined time. Therefore the movement is limited and the wear and tear occur with years of use.

Furthermore, in order to display a character, the liquid crystal display panel described above is sometimes used.

In a watch or clock using such a liquid crystal panel, time information and calendar information are displayed in digital form in a black display on a white background in an ordinary, normally-white mode.

However, digital display of time information or calendar information in only a black display on a white background is monotonous in design, lacks an interesting point, and loses its popularity among customers, which results in a decrease of demand of a digital display watch or clock. Accordingly, a digital display watch or clock with a variety of designs has been sought.

A method of shielding a portion of or all of a time-display section on a watch or clock in accordance with circumstances at the time of use or internal condition of the watch or clock has been studied, but the progress can not be said sufficient in terms of making the timepiece thinner and regarding the controllability. Switching between the display and no display of information, carried out by control of opening and closing of a time-display section of a watch or clock through the comand input by a timepiece user or a signal from the outside from a timer or comand communication method, or by using a portion of the time-display section itself as a shutter, is sought. However, the design problems of such a timepiece have not been erased.

Furthermore, in the case of a table clock or a wall clock equipped with a marionette and the like, opening and closing of a screen or a door to show the motion of the doll and the like to viewers are carried out mechanically at present, which limits the movement and also causes a disadvantage of deterioration occuring with years of use.

A first object of the present invention is to solve the disadvantages described above and provide a digital-type timepiece, analog-type timepiece or combination digital- and analog-type timepiece having a variety of designs. A second object of the present invention is to improve the design and provide a timepiece offering much variety in the manner in which the time-display section can be closed or opened in accordance with a control signal based on the circumstances where the timepiece is in use or based on a user-input comand, or in accordance with the internal conditions of the timepiece.

A third object is to provide a timepiece, including a table clock or a wall clock equipped with a marionette and the like, with an innovative design wherein, the display portion, such as a stage presenting dolls and the like, can be opened or closed whenever required without employing a mechanical means.

DISCLOSURE OF THE INVENTION

In order to achieve the aforementioned object, a time piece according to the present invention is a watch or clock having a time-display section and is provided with a reflection-type polarizing film, which reflects the light linearly polarized in the direction orthogonal to the transmission axis thereof, on at least a portion in front of or at the back of the time-display section.

The reflection-type polarizing film may be arranged so as to form a portion of the time-display section and occupy at least a portion of the display surface.

In these timepieces, it is preferable to provide an optical modulation section to vary a ratio of the amount of light incident in the direction to the transmission axis of the reflection-type polarizing film, to the amount of light incident in the direction orthogonal to the transmission axis thereof.

The optical modulation section is a means to make the reflection intensity and the transmission intensity variable for incident light passing through the reflection-type polarizing film, by making vary a ratio of the light incident in the direction to the transmission axis of the reflection-type polarizing film to the light incident in the direction to the reflection axis thereof, intersecting with the transmission axis at right angles.

It is possible to form a shutter which selectively performs transmitting and shielding of the light incident on at least a portion of the time-display section through the reflection-type polarizing film and the optical modulation section.

The optical modulation section may have a liquid crystal layer, an electrode to apply voltage on the liquid crystal layer, the second reflection-type polarizing film, and any one of an absorption-type polarizing film or a color polarizing film.

Alternatively, the optical modulation section may be rotatably provided with any one from an absorption type polarizing film, the second reflection-type polarizing film, a color polarizing film, or a grid-type polarizing film in a manner that the angle between respective transmission axes can be changed in relation to the reflection-type polarizing film.

The reflection-type polarizing film may be provided with an opening portion and/or a shielding portion.

It is suitable to provide a supplemental light source to irradiate light from a viewer side or from the reverse side toward the reflection-type polarizing film.

Furthermore, a film which forms visible information may be provided on the opposite side from the viewer to the reflection-type polarizing film and the optical modulation section which compose the shutter.

The present invention can be applied to a timepiece having a power-generating element.

In this case, the above described optical modulation section may have a function to make at least one portion of the power-generating element be a sensor to detect its power generation amount and to make a ratio of light incident on a transmission axis of the reflection-type polarizing film to light incident on a reflection axis intersecting the transmission axis at right angles be variable based on an output signal of the sensor.

The power-generating element may be any of a thermal power-generating element to generate electricity by means of temperature difference, a power-generating element which converts kinetic energy into electric energy, or power-generating element which converts optical energy into electric energy (a solar cell).

It is also possible to be provided with any sensor or a plurality of sensors from among a sensor detecting a signal operated by a user, a sensor detecting the applied circumstances, a sensor detecting a time displaying condition of the time-display section, or a sensor detecting a radio wave signal having a specific frequency, and to have a function to make a ratio of light incident on a transmission axis of the reflection-type polarizing film to a light incident on a reflection axis intersecting the transmission axis at right angles be variable in accordance with a detected signal of the sensor.

The optical modulation section described above can be comprised of a first polarizing film, a liquid crystal cell which fills a liquid crystal layer between two transparent substrates each having an electrode on the facing inner surface, and a second polarizing film, in order from the visible viewer side, in which at least any one of the first polarizing film and the second polarizing film is a reflection-type polarizing film.

The present invention can be applied to any one of a watch or clock in which the time-display section described above is an analog-type time-display section displaying hours, minutes, seconds and so on with hands, a watch or clock in which the time-display section is a digital-type time-display section displaying the time information with numerals, or a watch or clock using a combination of those described above.

In a watch or clock equipped with an analog-type time-display section or a digital-type time-display section, it is possible that any one or both of the time-display sections described above are provided at the back of a shutter consisting of the reflection-type polarizing film and the optical modulation section, and areas of a visible portion and an invisible portion of the time displaying section are controlled by means of changing the optical characteristic of the liquid crystal layer by applying voltage between electrodes of the liquid crystal cell which forms the optical modulation section described above, and that the section of the shutter corresponding to the invisible portion of said time displaying section has a reflecting characteristic.

BEST MODE FOR CARRYING OUT THE INVENTION

Figure 1:
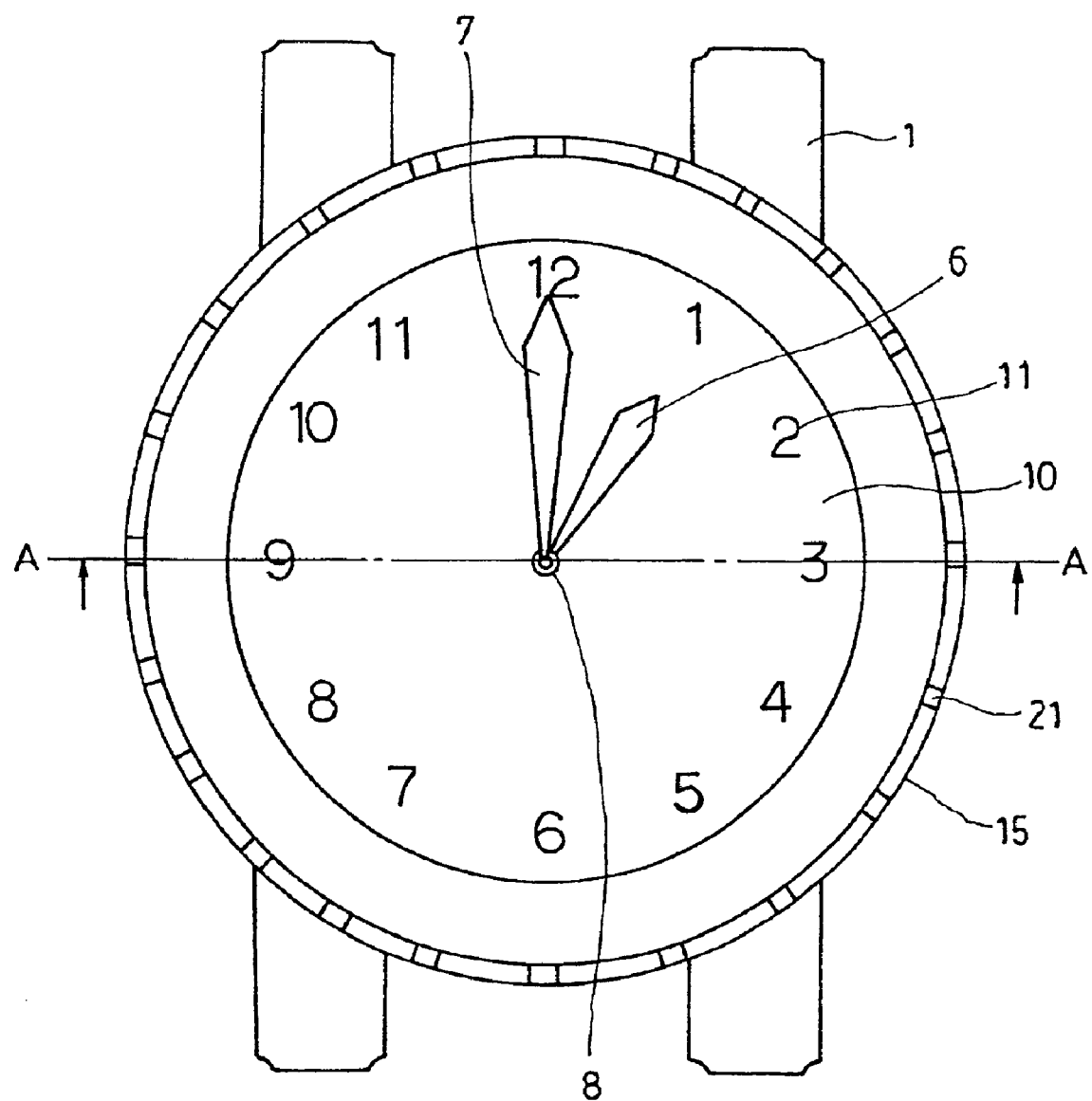
FIG. 1 is a plane view of a watch showing a first embodiment of the present invention.
Figure 2:
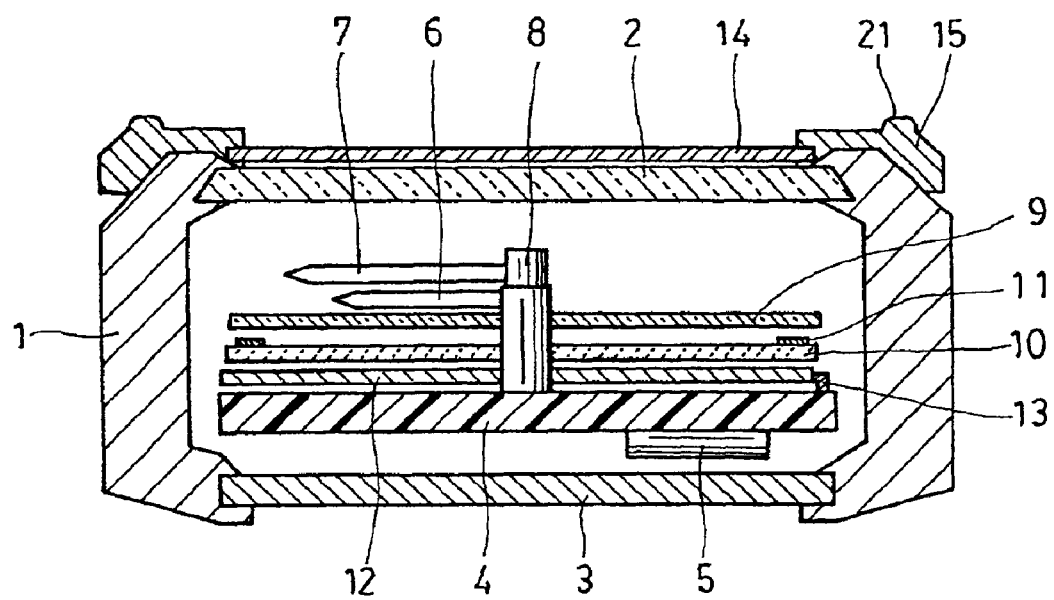
FIG. 2 is a schematic sectional view taken along the line A—A in FIG. 1.
Figure 3:
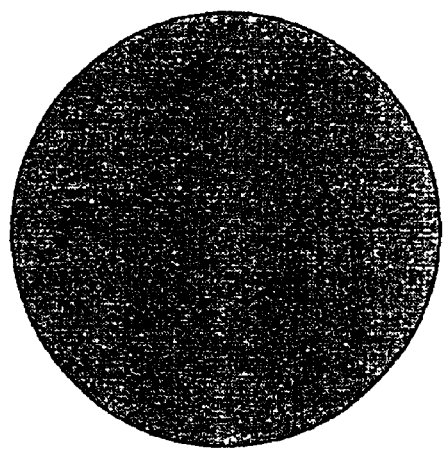
FIG. 3 is an explanatory view of a shutter function of a watch that is also the first embodiment.
Figure 3:
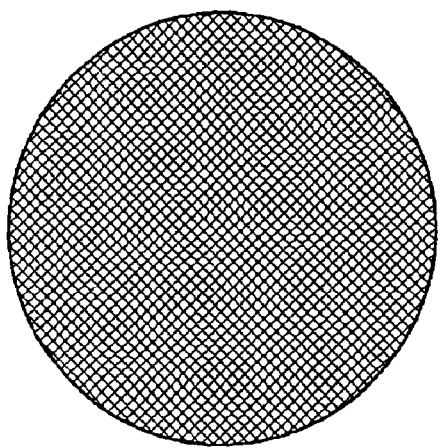
Figure 3:
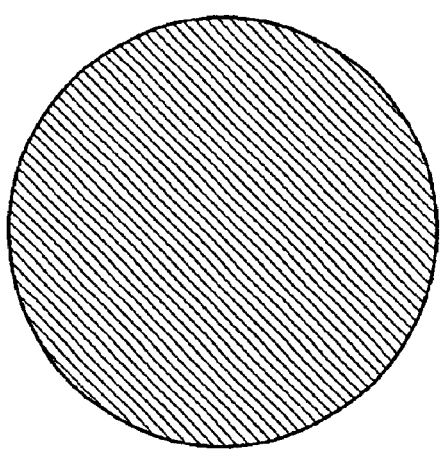
Figure 3:
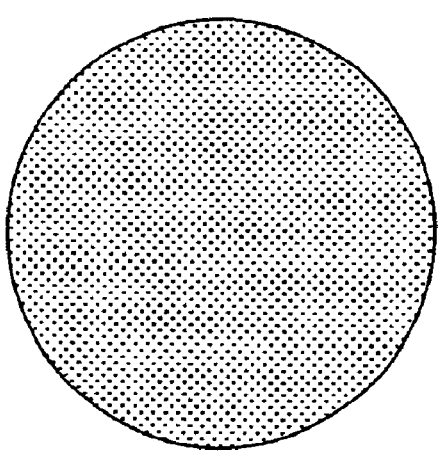
Figure 3:
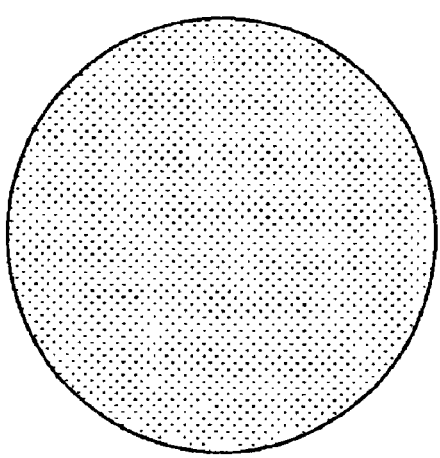
Figure 3:
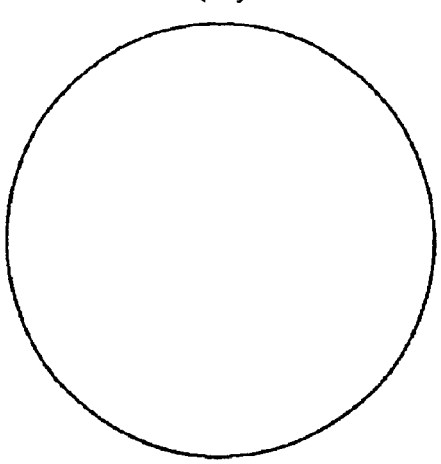

Embodiments best-suited to carrying out the invention will be explained hereinafter with reference to the drawings.
First Embodiment: FIG. 1 to FIG. 3

FIG. 1 is a plane view of a watch showing the first embodiment of the present invention, and FIG. 2 is a schematic sectional view taken along the line A—A in FIG. 1.

A case 1 is provided with glass 2 and a case back 3, and a time-display section includes a printed circuit board 4 having an electric circuit, and a stepping motor and the like to drive a hand shaft 8, a secondary battery 5, an hour hand 6 and a minute hand 7 which are connected to the hand shaft 8. Incidentally, the hour hand shaft and the minute hand shaft are concentrically inserted into the hands shaft 8.

A reflection-type polarizing film serving as a first polarizing film 9 is arranged between the hour hand 6 and the printed circuit board 4. On the case back 3 side (back side) of the reflection-type polarizing film 9, provided is the dial 10 on which numerals from "1 to 12" expressing the time are printed near the periphery of a front surface of a translucent ceramic substrate.

On the back side of the dial 10, an electro-luminescent light (EL) is provided as a supplementary light source 12. The supplementary light source 12 is connected to the printed circuit board 4 through a terminal 13 for the supplementary light source and is turned on automatically, when necessary, by detecting the circumstances external to the watch with a sensor that will be described later.

On the upper surface side of the peripheral portion of the glass 2 used in the case 1, an absorption-type polarizing film with a high transmittance is disposed as a second polarizing film 14. The second polarizing film 14 is sandwiched with two plates of thin reinforced glass, and fixed to a polarizing film-holding ring 15. The polarizing film-holding ring 15 is rotatably fitted mechanically to a side wall of the case 1 so that it can be rotatably operated at will by a user of the watch. On the polarizing film-holding ring 15, many protuberance portions 21 are formed along the periphery to facilitate the rotational operation.

Here, the reflection-type polarizing film used as a first polarizing film 9 is a polarizing film which has a function of transmitting the light linearly polarized in the direction parallel to the transmission axis but which reflects the light linearly polarized in the direction intersecting with the transmission axis at right angles.

The absorption-type polarizing film used as the second polarizing film 14 is a polarizing film which has a function of transmitting the light linearly polarized in the direction parallel to the transmission axis but which absorbs the light linearly polarized in the direction intersecting with the transmission axis at right angles.

Therefore, by turning the second polarizing film 14 so as to make an angle variable between the reflection-type polarizing film and the transmission axis of the absorption-type polarizing film, the ratio of the light incident on the transmission axis to the light incident on the reflection axis, intersecting with the transmission axis at right angles, is made variable in relation to the light incident on the reflection-type polarizing film that is the first polarizing film 9, so that the amount ratio of transmitted light to reflected light by the first polarizing film 9, that is, reflection intensity and transmission intensity, can be made variable.

For the reflection-type polarizing film used in the embodiment, for instance, optical film DBEF (trade name) sold by SUMITOMO 3M Co., Ltd. may be used.

According to the watch in the first embodiment, the turning operation of the holding ring 15 for the polarizing film fitted to the case 1 makes the second polarizing film 14 rotate, which makes an angle between the respective transmission axes of the second polarizing film 14 and the polarizing film 9 on the dial 10 variable from 0° (full transmission) to 90° (full reflection).

Through the above operation, the state of the display area can be varied in a manner that the reflection ratio gradually increases from a state in which all the time-display section on the dial 10 is visible, through a state of half transmission and half reflection, to a state of full reflection (wherein the dial 10 becomes invisible).

Thus, by turning the second polarizing film 14 on the dial 10, the design of a watch can be changed in a manner that, for instance, full reflection on x day, semi-transmission on x+1 day, and full transmission on x+2 days and so on.

Here, the shutter function by the first polarizing film 9 and the second polarizing film 14 will be explained using FIG. 3.

By turning the second polarizing film 14, an angle between the transmission axes of the first polarizing film 9 and the second polarizing film 14 varies, and the ratio of light along the transmission axis to the light along the reflection axis varies, light on both axes being light incident on the reflection-type polarizing film, that is the first polarizing film 9.

Through this, as shown in FIG. 3, the state of the time-display section varies from a full reflection state (a) in which the transmission axis of the first polarizing film 9 intersects with the transmission axis of the second polarizing film 14 at right angles (an intersecting angle of 90°); through a state (b) with the intersecting angle of 70° in which the amount of reflection somewhat decreases and a blackish tone increases; a state of half reflection and half transmission (c) with the intersecting angle of 45°; a state (d) with the intersecting angle of 30° in which the reflection lowers and the blackish tone lowers; and a state (e) with the intersecting angle of 20° in which the transmittance is considerably high, to a state (f) with the intersecting angle of 0° in which the transmittance becomes maximum.

In this case, when the light incident on the first polarizing film 9 is fully reflected (a), the dial 10, time-indicating letters 11, hour hand 6, and minute hand 7 become very difficult to observe. In other words, the back side of the second polarizing film 14 is almost shielded.

Furthermore, the lowering in reflectance and the increasing in transmittance are possible by means of varying angle between the transmission axes of the first polarizing film 9 and the second polarizing film 14. The full reflection (a) and the full transmission (f) corresponds to opening and closing of the shutter actuated by a shutter function performed by the first polarizing film 9 and the second polarizing film 14. Further, the middle state is a semi-reflection state or a semi-transmission state, namely, a middle state of the shutter.

As explained above, by control of the reflection and transmission with the first polarizing film 9 and the second polarizing film 14, the performance of the on-off or middle state between the on-off, for the presentation of the time-display section disposed on the back of the second polarizing film 14, is called the shutter function.

While the first embodiment, the user of the watch turns the second polarizing film manually, the shutter function is sufficiently effective if the polarizing film is turned together with the turning of a minute hand or an hour hand, or turned by a motor through the operation of a control switch.

The above explanation is for an embodiment of a wrist watch, but when the size of the time-display section or the shape of the case 1 is changed, the present invention can be applied to a table clock or a wall clock.

Figure 5:
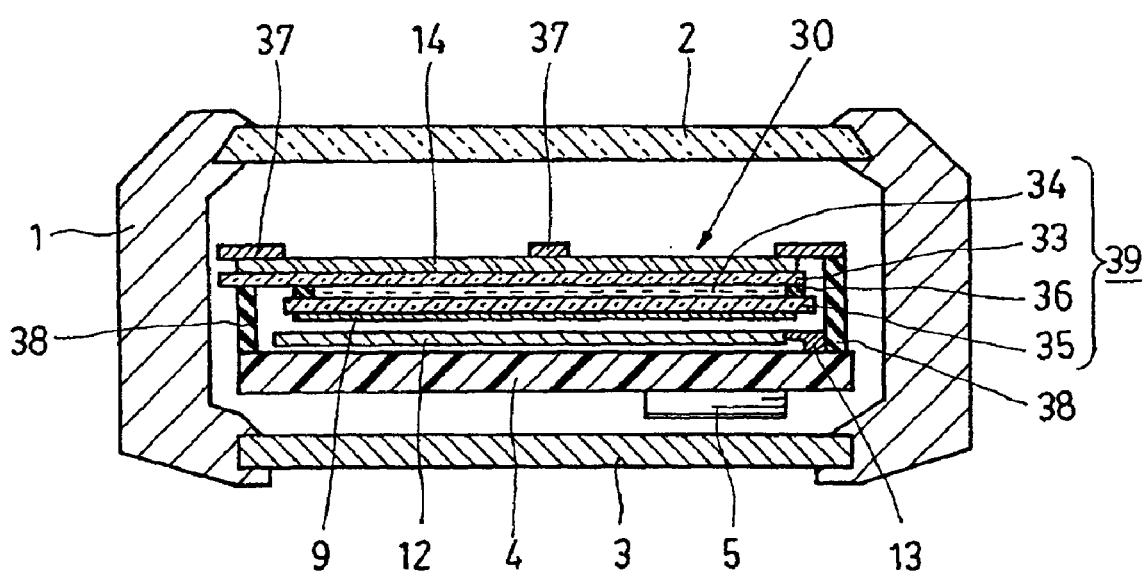
FIG. 5 is a schematic sectional view taken along the line B—B in FIG. 4.
Figure 4:
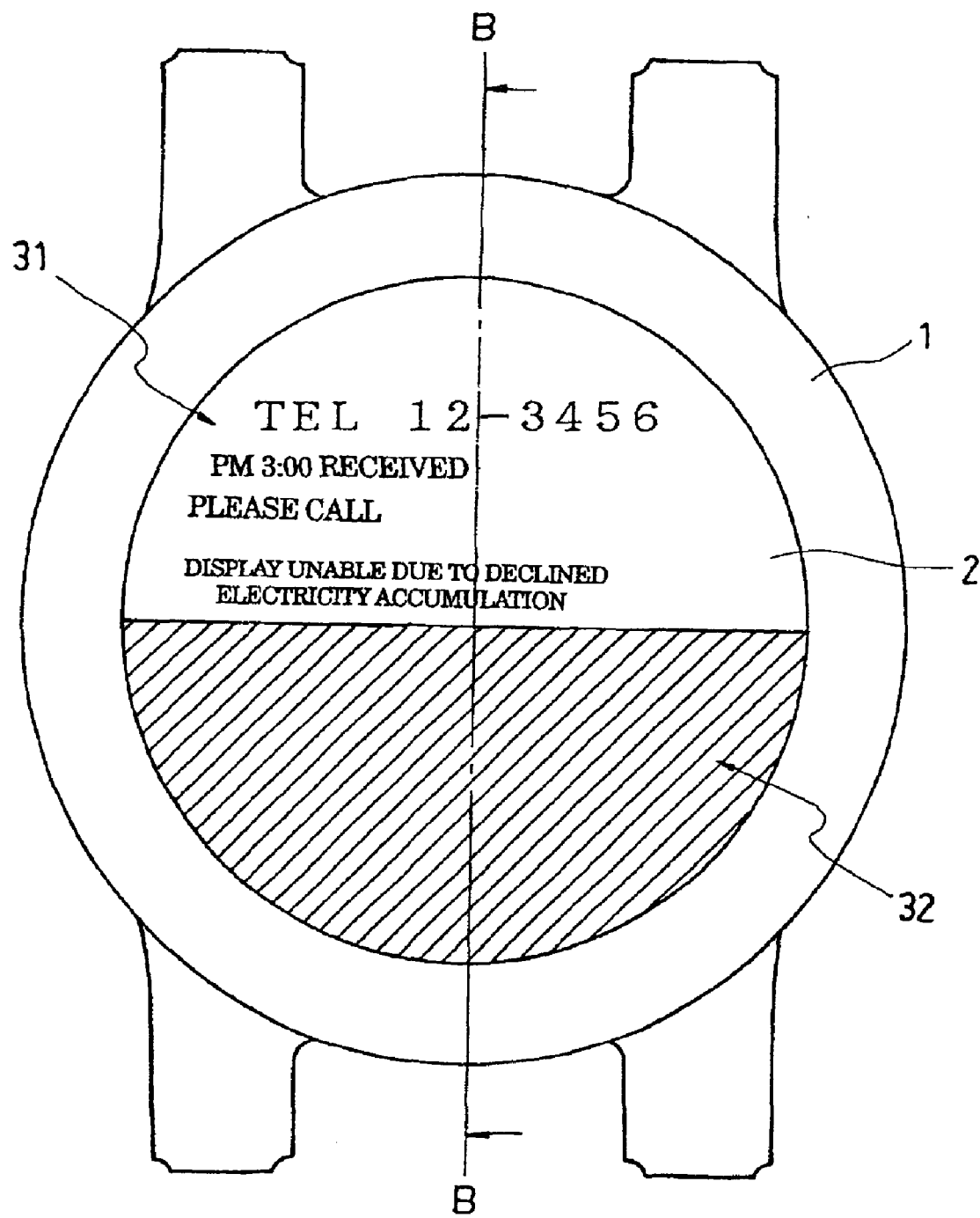
FIG. 4 is a plane view of a watch showing a second embodiment of the present invention.

Second Embodiment: FIG. 4, FIG. 5

A second embodiment of the present invention will be explained with reference to FIG. 4 and FIG. 5.

In the embodiment, a shutter function is performed by the interplay of the first polarizing film 9, the second polarizing film 14, and a liquid crystal cell 39.

By applying the liquid crystal cell 39, the shutter function can be electrically varied. For the time-display section, a liquid crystal display panel which is the same as that for the shutter function is applied. Consequently, a watch can be made thinner.

FIG. 4 is a plane view of a watch showing the second embodiment. FIG. 5 is a schematic sectional view taken along the line B—B.

A liquid crystal display panel used in the embodiment displays much character information to apply to both a time-display section and an optical modulation section, and a matrix-type liquid crystal display panel is adopted to further enrich the shutter function.

As a polarizing film to form a liquid crystal display panel 30 with a liquid crystal cell 39 shown in FIG. 5, a reflection-type polarizing film is adopted for the first polarizing film 9 which is disposed on the back side of the liquid crystal cell 39 and an absorption-type polarizing film is adopted for the second polarizing film 14 which is disposed on the surface side of the liquid crystal cell 39.

Furthermore, the matrix-type liquid crystal display panel 30 has a shutter function, and as shown in FIG. 4, the first display area 31 displays character information, and a shutter function works on a second display area 32 and it shows a full reflection state in which important information is shielded.

Thus, the liquid crystal display panel 30 is roughly divided into a first display area 31 and a second display area 32, and in order to minimize power consumption when the shutter works, no voltage is applied on the second display area 32 in a state shown in FIG. 4. Since the matrix-type liquid crystal display panel 30 is used in the embodiment, a digital-type time-display section which displays time with letters or an analog-type time-display section which displays time with hands can be expressed with a liquid crystal display panel.

Therefore, the electrode arrangement in the matrix-type liquid crystal display panel 30 adopts an arrangement extending in a round shape, and one side area out of the area divided into an upper portion and a lower portion is also applicable as an analog-type time-display section. When a portion of the display is shut, only one out of the upper portion and the lower portion of the matrix-type liquid crystal display panel 30 is displayed.

In the case 1 of the wrist watch, glass 1 and a case back 3 are provided as shown in FIG. 5, and the time-display section includes a printed circuit board 4, a secondary battery 5, a matrix-type liquid crystal display panel 30, and a zebra-rubber connector 38 to connect the liquid crystal display panel 30 with the printed circuit board 4. The time display is performed by the matrix-type liquid crystal display panel 30.

The matrix-type liquid crystal display panel 30 is formed including, in order from the glass 2, an absorption-type polarizing film as the second polarizing film 14, the liquid crystal cell 39, and a reflection-type polarizing film as the first polarizing film 9.

In order to prepare the liquid crystal cell 39 a first substrate 33 and a second substrate 35, having a transparent electrode on each confronting inner surface, are bonded through a sealing agent 36, and the liquid crystal 34 is filled in the gap thereof. The sealing agent 36 contains a conductive particle. In order to reduce power consumption by keeping the display quality of the matrix-type liquid crystal display panel 30, a switching element is provided for electrodes which form each pixel of the liquid crystal cell 39.

The switching element has a three-terminal-type switching element and a two-terminal-type switching element, and by providing the switching element, a signal for applying voltage on the liquid crystal 34 can be output intermittently.

Further, in order to apply an aligning treatment to the liquid crystal 34, an alignment film is coated on the first substrate 33, a first electrode formed in the inner surface thereof, the second substrate 35 and a second electrode formed in the inner surface thereof to perform the aligning treatment, and the liquid crystal cell 34 forms a twisted-nematic-type liquid crystal cell (TN) which twists to 90° while the liquid crystal 34 passes from the first substrate 33 to the second substrate 35.

A reflection-type polarizing film is used for the first polarizing film 9, and a transmission-type polarizing film is used for the second polarizing film 14, and the transmission axes of the first polarizing film 9 and the second polarizing film 14 are arranged in parallel with each other. That is, when the power supply to the liquid crystal cell 39 is suspended, since linearly polarized light which is passed through the second polarized film 14 is twisted by 90° through the liquid crystal cell 39 and the direction of polarization of light incident into the first polarizing film 9 intersects with its transmission axes at right angles, the light is totally reflected by the first reflection-type polarizing film 9 so that the liquid crystal display panel 30 can display a metallic reflection surface.

A shielding film 37 is arranged on the second polarizing film 14 to shield a sealing agent 36, a processed edge and so on used for the liquid crystal display panel 30. By adopting a colored polarizing film for the shielding film 37 and by printing numerals showing the hour on the color polarizing film, a full colored time-display can be realized.

Furthermore, in order to connect the liquid crystal panel 30 with the printed circuit board 4, a zebra-rubber connector 38 which is made of a laminated layer consisting of conductive particles and an insulating material. Since a group of electrodes of the matrix-type liquid crystal display panel 30 are divided into an upper portion and a lower portion as shown in FIG. 4, the zebra-rubber connector 38 is connected to the printed circuit board 4 from three directions of top, bottom, and vertical.

An electroluminescent lamp (EL) is used as a supplementary light source 12 to be used when the wrist watch is used in the dark, and the lamp is connected through the printed circuit board 4 and a terminal 13 for the supplementary light source so that the thickness of the wrist watch can be reduced. A gap is arranged between the supplementary light source 12 and a reflection-type polarizing film, that is the first polarizing film 9. Thus, a contrast ratio of two values for a reflecting portion and a dark display becomes large so that it can be used for the display of the matrix-type liquid crystal display panel 30, when the supplementary light source 12 is not on.

FIG. 4 shows that various information is displayed on the upper first display area 31, and on the lower second display area 32, the display is entirely suspended in response to the decrease of the electricity accumulation amount, so that the lower second display area 32 is used as a reflection section.

Furthermore, the shutter function of the wrist watch is not limited to the two-way divided area of the first display area 31 and the second display area 32, but a shutter obtained from various areas can be realized by means of a control signal to the liquid crystal display panel 30 because the matrix-type liquid crystal display panel 30 is used.

Figure 6:
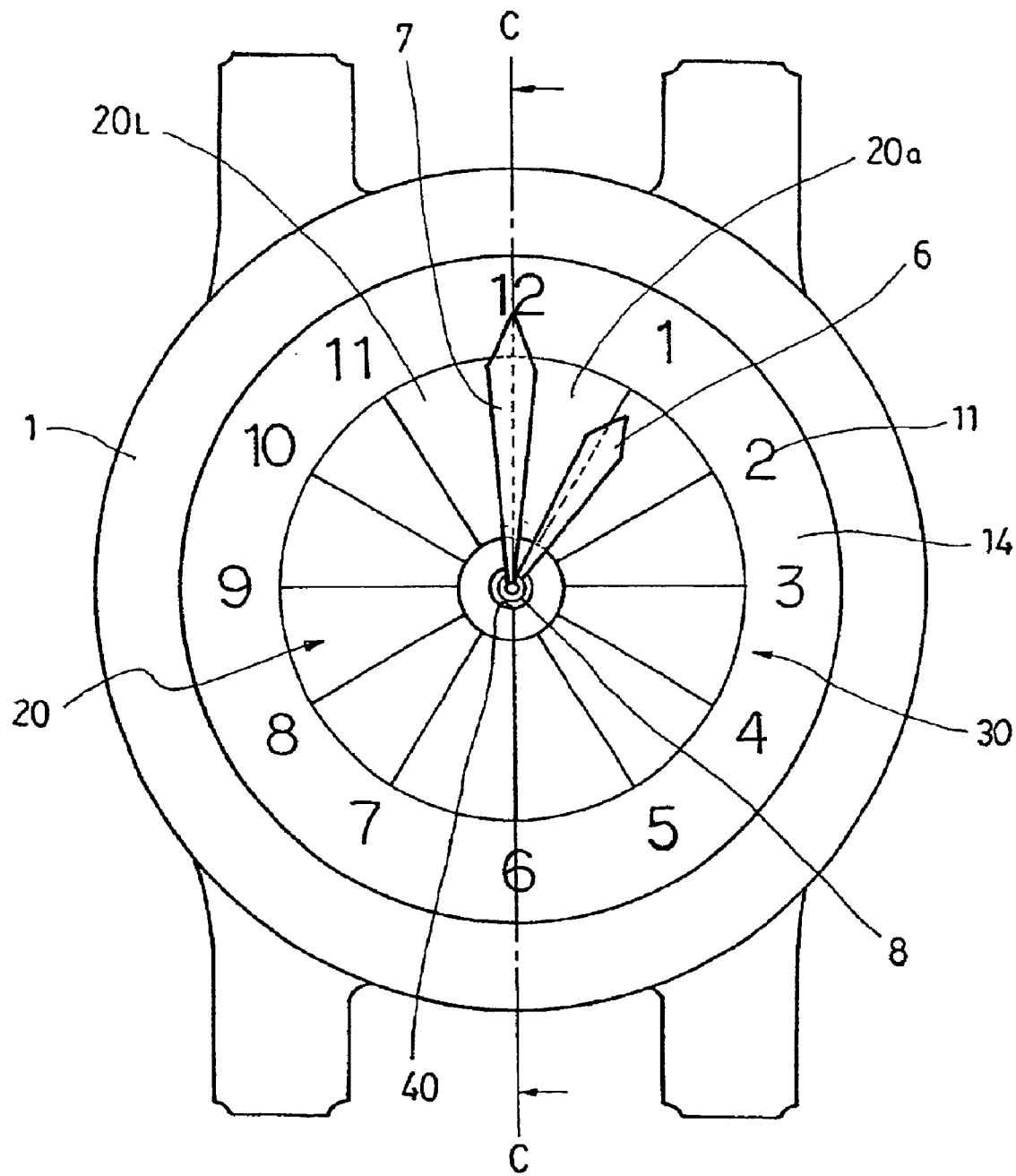
FIG. 6 is a plane view of a watch unit showing a third embodiment of the present invention.
Figure 7:
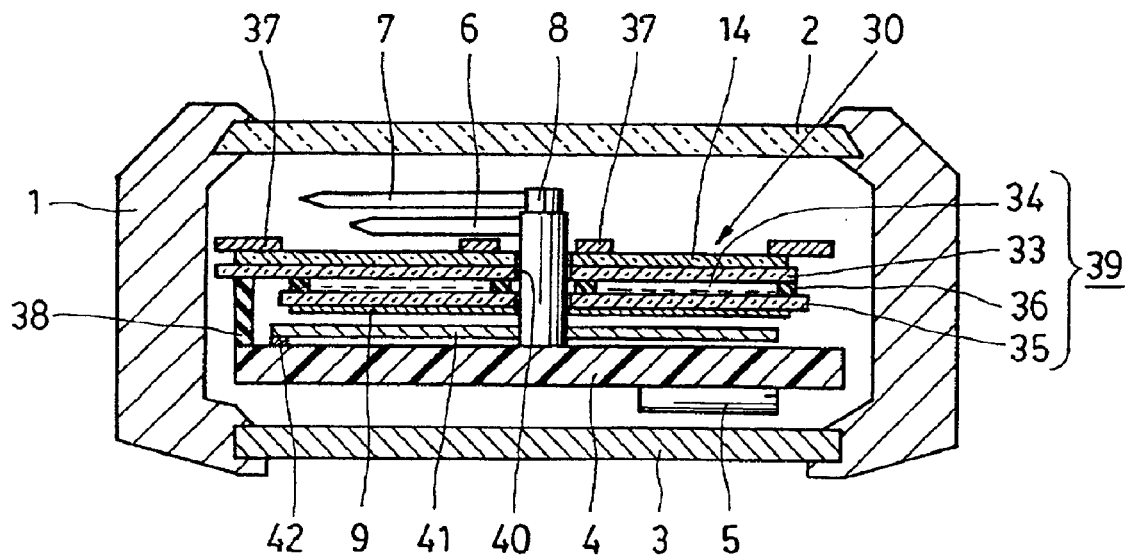
FIG. 7 is a schematic sectional view taken along the line C—C in FIG. 6.

Third Embodiment: FIG. 6, FIG. 7

Next, the third embodiment of the present invention will be explained with reference to FIG. 6 and FIG. 7.

The formation in the third embodiment will be explained, in which both of the polarizing films that form the liquid crystal display panel 30 are of a reflection-type polarizing film and are used as an optical modulation section, and a solar cell is provided as a power-generating element.

It is an embodiment in which a shutter function to vary the ratio of a transmission area having a large transmittance to a reflection area having a large reflectance in the liquid crystal display panel using a reflection-type polarizing film in accordance with the intensity of light incident on a solar cell and the magnitude of electricity accumulation amount, is provided, and the amount of power generation of the solar cell is displayed, a danger signal due to decrease of the electricity accumulation amount is issued, and control of an amount of power generation of the solar cell is carried out.

A case 1 of the wrist watch is equipped with glass 2 and a case back 3 as shown in FIG. 7, and a time-display section includes a printed circuit board 4, a secondary battery 5 which serves as a power source such as for a stepping motor to drive a hand shaft 8, an hour hand 6 and a minute hand 7 connecting to a hand shaft 8. Further, on the printed circuit board 4, a solar cell 41 to convert optical energy into electric energy is disposed as a power generating element, and is connected with a connecting terminal 42.

The liquid crystal display panel 30 in the embodiment is nearly the same as the liquid crystal display panel 30 used in the above-mentioned second embodiment, and a reflection-type polarizing film is adopted for both the first and second polarizing films 9 and 14. A reflection-type polarizing film as the first polarizing film 9 and a reflection-type polarizing film as the second polarizing film 14 are arranged in a manner such that their transmission axes intersect with each other at right angles.

Furthermore, on the central portion of the liquid crystal display panel 30, a hand shaft hole 40 for a hand shaft 8 to pass through is provided, and a sealing agent 36 is provided around the hole 40 for reinforcement.

For the liquid crystal 34 which is filled in the liquid crystal cell 39, a super twisted nematic (STN) liquid crystal which twists in the range of 180° to 260° from the first substrate 33 to the second substrate 35 is used.

On the reflection-type polarizing film, that is the first polarizing film 9, a shielding film 37 is provided to shield around a sealing agent 36 which forms a liquid crystal display panel 30, an end of processed portion, and a hand shaft hole 40.

To connect the liquid crystal display panel 30 and the printed circuit board 4, a zebra-rubber connector 38 which is formed by laminating conductive particle and insulating material is used.

As shown in FIG. 6, the liquid crystal display panel 30 has a round shape display area 20 consisting of a first display area 20a to a twelfth display area 20L which are divisions of 12 parts around the hand shaft hole 40, the number "12" being the same number as the hour "12". A ratio of the amount of the reflected light to the amount of the transmitted light through the first polarizing film 9 can be respectively controlled in each display area 20a to 20L which is a division of the display area 20.

Time-indicating letters 11 from "1" to "12" which indicate time are printed on the second polarizing film 14.

According to the wrist watch in the third embodiment, a shutter function which varies a ratio of a reflection area to a transmission area of the liquid crystal display panel 30 is operated to intensify light incident on the solar cell 41 in response to a decrease of the electricity accumulation amount so that an amount of transmission area is increased. For this purpose, the shutter of the liquid crystal display panel 30 is opened and closed from the first display area 20a to the twelfth display area 20L. Since the transmittance rises as voltage applied to the liquid crystal cell 39 decreases, the power consumption of the liquid crystal display panel 30 can be reduced and the transmittance of the liquid crystal display panel 30 can be enlarged when a solar cell is used as a power-generating element, wherein the shutter function of the liquid crystal display panel works most effectively.

By forming an interference film on the surface of the solar cell 41, when the transmittance of the liquid crystal display panel 30 becomes large, each display area can be displayed in various color, such as a rainbow of colors, by reflection from the solar cell 41.

Further, by combination of the first polarizing film 9 and a color filter or a color polarizing film, color display can be realized. By changing the color of the color filter according to each display area of the display area 20 shown in FIG. 6, the amount of generated electricity and the amount of accumulated electricity of the solar cell 41 can be displayed in conjunction with the shutter function of the liquid crystal display panel 30.

As is detailed in the above explanation, the embodiment is very effective due to special characteristics of the wrist watch which adopt a reflection-type polarizing film for the liquid crystal display panel 30 of the wrist watch. In addition, by controlling the reflectance and the transmittance of the liquid crystal display panel 30 which uses a reflection-type polarizing film in accordance with the amount of generated electricity and the amount of accumulated electricity of the power generating element, the amount of generated electricity and the amount of accumulated electricity can be displayed without degrading the appearance of the wrist watch, and which contributes to enlarge the range of applications of a watch having a power generating element.

Particularly, when the power generating element is a solar cell, by varying the intensity of light incident on the solar cell, the accumulated electricity amount can be averaged. Furthermore, by selecting a mode of the liquid crystal display panel, improvement of the appearance, display of the electricity accumulating amount or the power generating amount, reduction of power consumption for driving the liquid crystal display panel, and adjustment of intensity of light incident on the solar cell can become possible.

When a solar cell is adopted as a power-generating element and a liquid crystal display panel having a reflection-type polarizing film is used, since a solar cell is generally opaque and it is necessary to let light in for power generation, it is necessary to utilize a transmitting portion of the liquid crystal display panel having a reflection-type polarizing film to let light in to the solar cell, and to remove as much as possible any matters blocking light from the glass 2 to the solar cell 41.

Therefore, in this embodiment, a method is adopted in which a supplementary light source used when a wrist watch is used in dark surroundings is disposed around the solar cell 41 between the liquid crystal display panel 30 having a reflection-type polarizing film and the printed circuit board 4, wherein light of the supplementary light source is emitted from a transmitting portion of the liquid crystal display panel 30 having a reflection-type polarizing film to a viewer side utilizing the reflection characteristic of the solar cell 41 and reflection characteristic of the first polarizing film 9. It is effective to dispose a reflection-type polarizing film, that is the first polarizing film 9, on the side facing the solar cell 41, in order to utilize the reflection characteristic of the reflection-type polarizing film.

The above explanation is for an embodiment applying to a wrist watch, but when the size of the time-display section or shape of the case 1 is changed, the present embodiment can be applied to a table clock or a wall clock.

Figure 9:
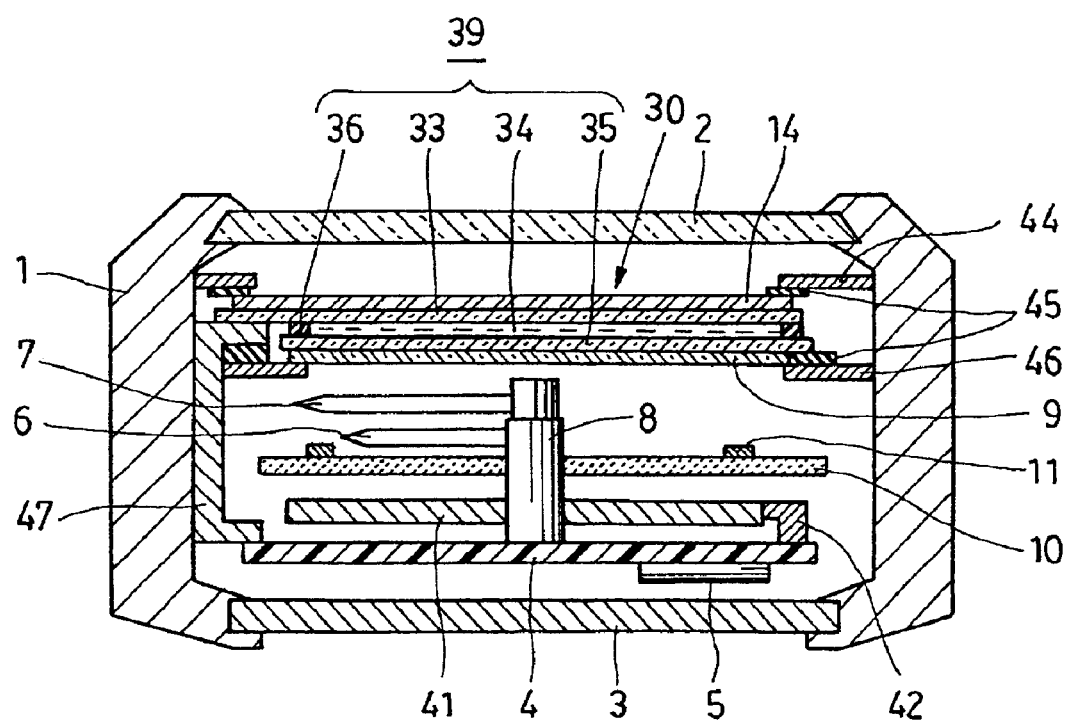
FIG. 9 is a schematic sectional view taken along the line D—D in FIG. 8.
Figure 8:
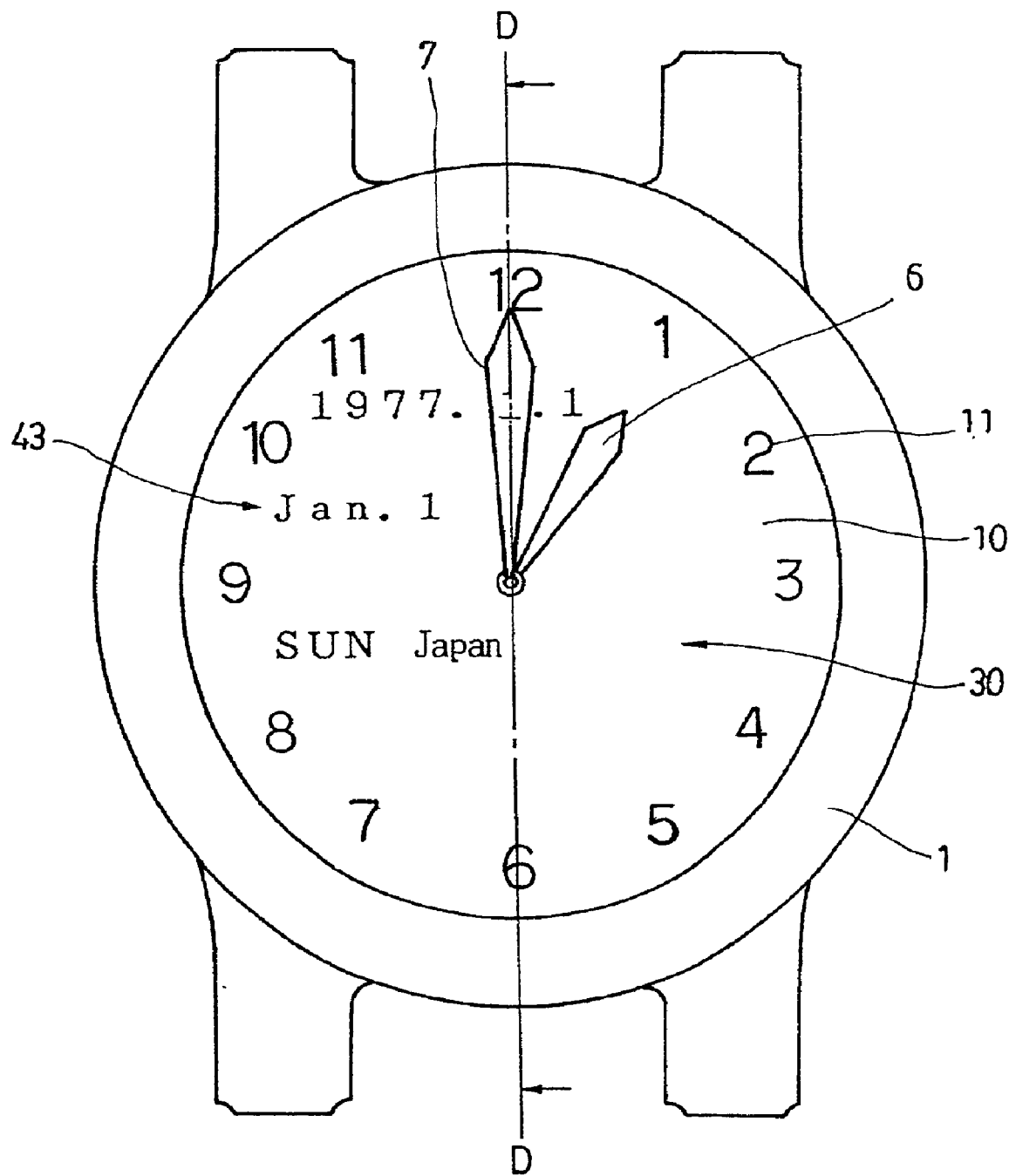
FIG. 8 is a plane view of a watch showing a fourth embodiment of the present invention.

Fourth Embodiment: FIG. 8, FIG. 9

Next, the fourth embodiment of the present invention will be explained with reference to FIG. 8 and FIG. 9.

The fourth embodiment has a structure in which a liquid crystal display panel 30 is disposed nearer to the glass side than to a time-display section.

FIG. 8 is a plane view of a watch showing the fourth embodiment, and FIG. 9 is a schematic sectional view taken along the line D—D in FIG. 8.

A case 1 of the wrist watch is equipped with glass 2 and a case back 3 as shown in FIG. 9. In order from the glass 2 side, high transmittance absorption-type polarizing film serving as a liquid crystal display panel 30 and as a second polarizing film 14, a liquid crystal cell 39, and a reflection-type polarizing film as a first polarizing film 9 are arranged.

The liquid crystal cell 39 is structured in the same way as is used in the first embodiment shown in FIG. 5. Since the liquid crystal display panel 30 needs to be supported above an hour hand 6 or a minute hand 7, the liquid crystal display panel 30 is fixed to the case 1 by holding it from upper and lower side with an upper stopper 44 and a lower stopper 46 which are fixed on the case 1, and a ring-shape rubber packing 45.

The printed circuit board 4 and the liquid crystal display panel 30 are connected with a connector 47, through which a predetermined driving signal is given to the liquid crystal display panel 30.

As shown in FIG. 8, a letter-display section 43 which displays characters can be arranged on the time-display section and further the liquid crystal display panel 30 becomes transparent when no voltage is applied.

When the liquid crystal display panel 30 is disposed in the inner side of the glass 2, since use of a reflection-type polarizing film as the second polarizing film 14 yields high reflectance and low visibility of the time-display section on the back side, it is preferable to adopt an absorption-type polarizing film for the second polarizing film 14. Further, in order to improve the appearance of the watch, it is understood to be important to improve the transmittance of the liquid crystal display panel 30 and for it to be colorless. Accordingly, in this embodiment, a high transmittance absorption-type polarizing film is adopted for the second polarizing film 14 and emphasis is laid on colorlessness in the visible region.

Furthermore, a twisted nematic (TN) type crystal which twists from the first substrate 33 to the second substrate 35 by about 90° is used for the liquid crystal 34 in the liquid crystal cell 39.

The absorption-type polarizing film, that is the second polarizing film 14, and the reflection-type polarizing film, that is the first polarizing film 9, are arranged in such a manner that their transmission axes intersect with each other at right angles so that the transparency becomes high when no voltage is applied.

On the back side of the liquid crystal display panel 30, the printed circuit board 4 to drive a hand shaft 8, a secondary secon 5, and the time-display section including an hour hand 6 and a minute hand 7 which connect to a hand shaft 8 are provided. On the printed circuit board 4, a solar cell 41 as a power-generating element which converts optical energy into electric energy is equipped. Between the hour hand 6, minute hand 7 and solar cell 41, the white dial 10 to shield the surface of the solar cell 41 is provided. A face made of high transmittance ceramic is adopted for the dial 10.

Thus, since the display is performed by disposing the liquid crystal display panel 30 in the inner side of glass 2 above the hour hand 6 and the minute hand 7 in the watch of this embodiment, recognition of displayed information is extremely improved. Decrease in reduction of electricity accumulation amount by suspending the display in response to lowering of electricity accumulation amount, and improvement of transmittance of the liquid crystal display panel 30 make efficiency of the power generation of the solar cell 41 improve, as the result, stoppage of quartz oscillation or stoppage of motion of the hour hand 6 or the minute hand 7 is prevented.

Furthermore, in the wrist watch shown in FIG. 8, opening-and-closing of the shutter of the liquid crystal display panel 30 is performed by one operation. FIG. 8 shows the manner of displaying letters, and in this embodiment, since the first polarizing film 9 and the second polarizing film 14 are disposed in the inner side of the glass 2 of the time-display section, the time-display section can be entirely shielded by the shutter function.

When exhaustion of the electricity accumulation amount or delay of the time-keeping occur, it is possible to shield the time-display section by means of the shuttering function and to inform the user of the abnormality of time display by reflecting incident light by means of the liquid crystal display panel 30. The display of the liquid crystal display panel 30 can be a metallic reflection panel. Consequently, the liquid crystal display panel 30 of the wrist watch can be used as a mirror.

When the embodiment is applied to a table clock, the clock can be used also as a mirror by setting the liquid crystal display panel 30 of the clock at a height suitable for a viewer.

The solar cell 41 is used for a power-generating element in this embodiment. When the shuttering function of the embodiment is utilized, even in the case of using a mechanical power generating means to convert kinetic energy of rotational movement of a rotor into electric energy or in the case of using a thermoelectric power-generating element to convert a temperature difference into electric energy, the reflection ratio or the transmission ratio can be controlled in accordance with the power-generating state of the power-generating element.

For instance, when the power generation is resumed after occurrence of error in the time-displaying or exhaustion of the electricity accumulation amount, when an error of time is found on resuming the operation of the time-displaying section, the shutter function utilizing the reflection-type polarizing film for the liquid crystal display panel 30 enhances its appearance and display the necessity of further readjustment of the time to the user.

Figure 10:
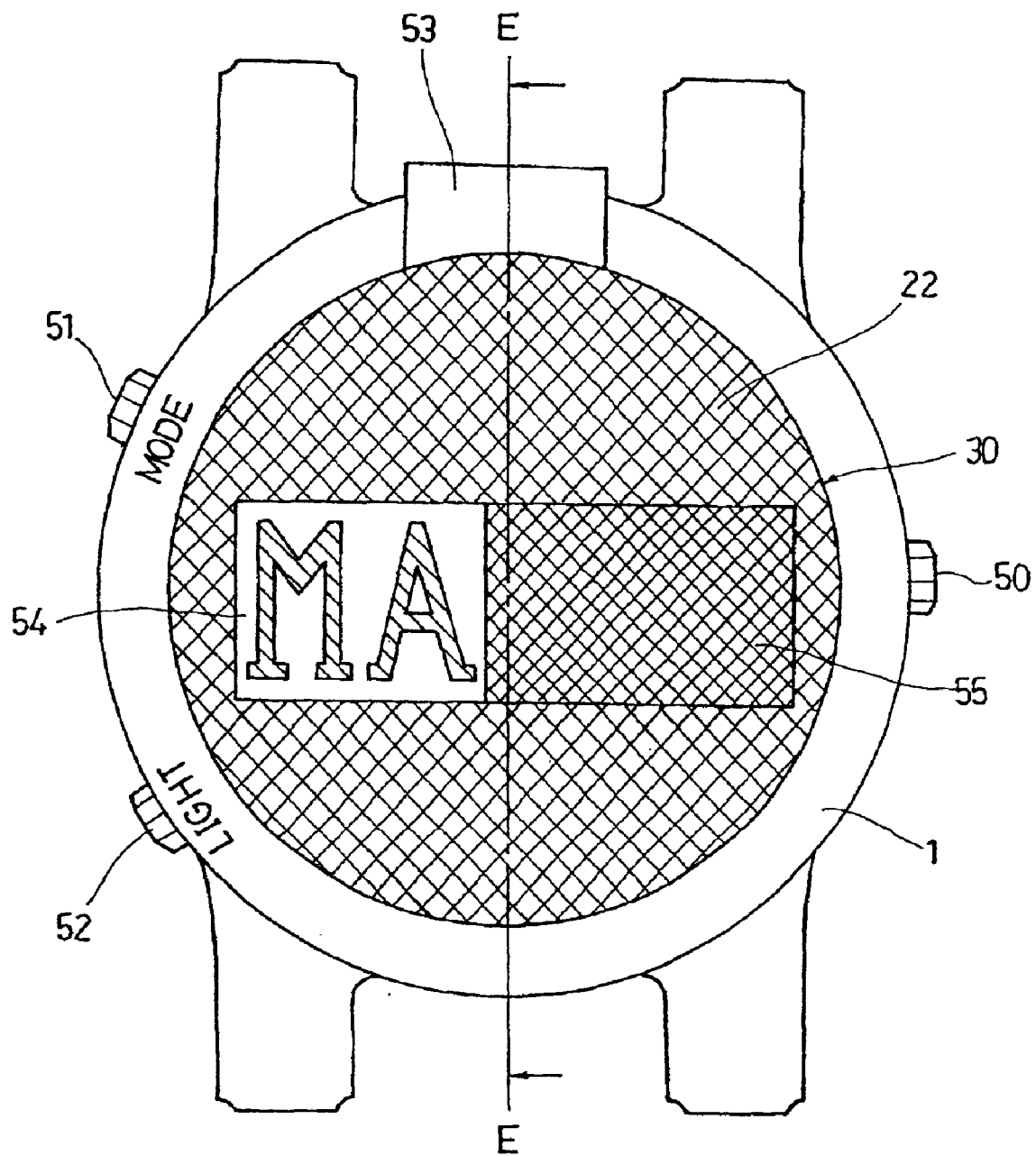
FIG. 10 is a plane view of a watch showing a fifth embodiment of the present invention.
Figure 11:
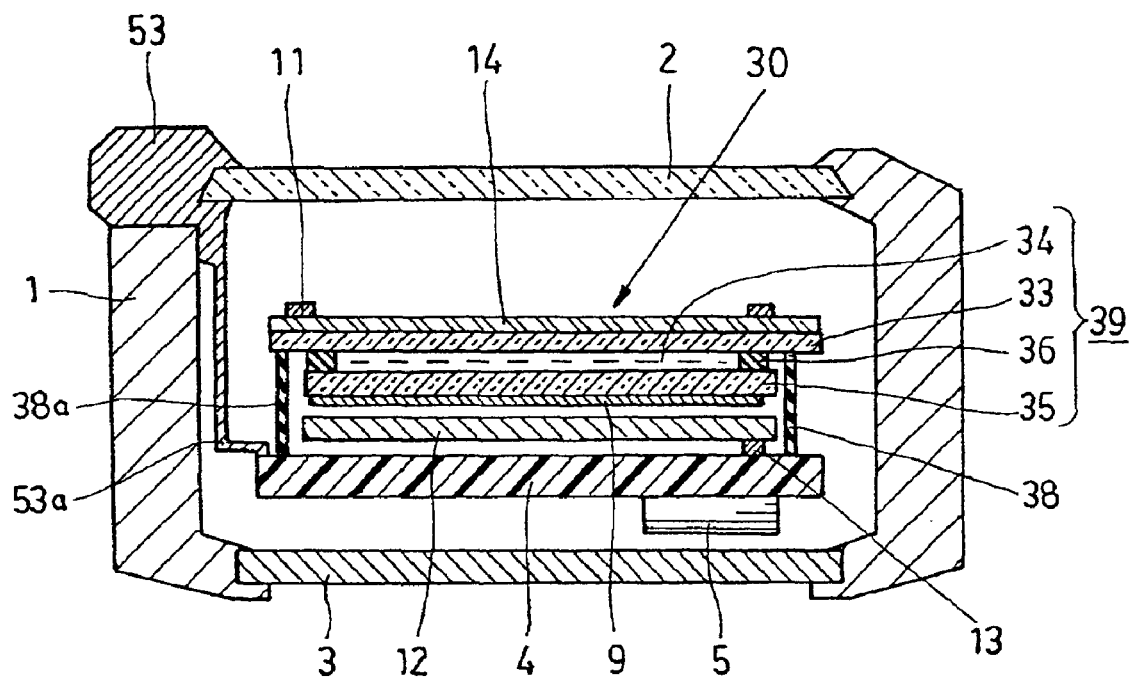
FIG. 11 is a schematic sectional view taken along the line E—E in FIG. 10.
Figure 12:
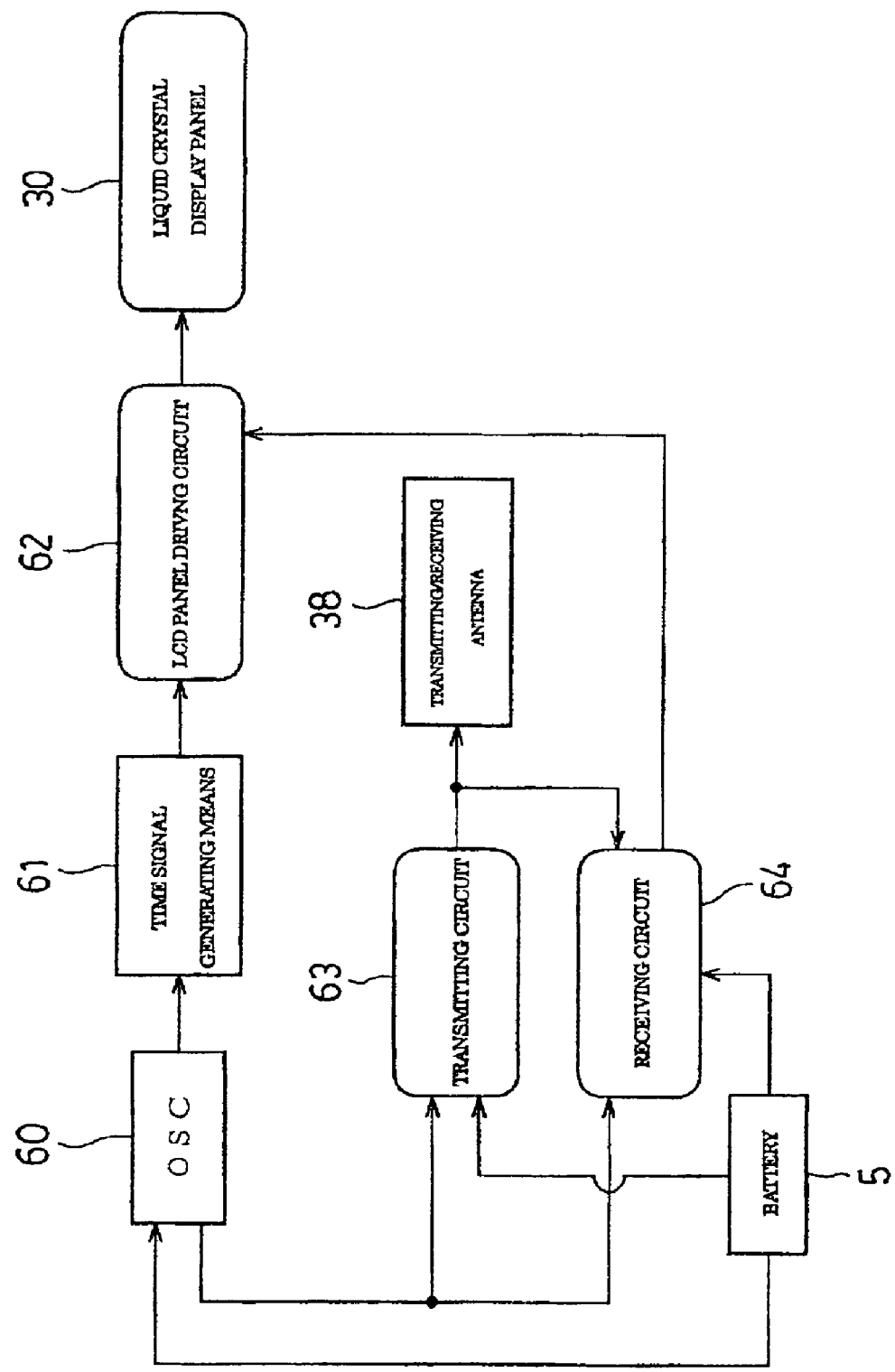
FIG. 12 is a block diagram showing a configuration of an electric circuit used for the watch illustrating the fifth embodiment according to the present invention.

Fifth Embodiment: FIG. 10 to FIG. 12

Next, the fifth embodiment of the present invention will be explained with reference to FIG. 10 to FIG. 12

The present invention performs a shutter function with interplay of a first and second polarizing films 9 and 14, and a liquid crystal cell 39. By utilizing the liquid crystal cell 39, the shutter function can be electrically varied.

A time-display section utilizes the same liquid crystal display panel as the shutter-function does. Therefore, a wrist watch can be made thinner. The wrist watch is equipped with a transmitting/receiving antenna 53 to detect a signal from the outside.

FIG. 10 is a plane view showing a watch of the fifth embodiment, and FIG. 11 is a schematic sectional view taken along the line E—E. FIG. 12 is a block diagram showing a structure of an electric circuit provided in the watch.

A liquid crystal display panel 30 used in the fifth embodiment adopts a matrix-type liquid crystal display panel 30 to present a lot of character information for efficiently utilizing it for both of a time-display section and an optical modulation section and also to enrich the shutter function. As a polarizing film to structure the liquid crystal display panel 30 together with the liquid crystal cell 39, a reflection-type polarizing film is adopted for the first polarizing film 9 and a absorption-type polarizing film for the second polarizing film 14.

The matrix-type liquid crystal display panel 30 has a shutter function and as shown in FIG. 10, all of the display area of the liquid crystal display panel 30 can display detailed information, however, for the sake of convenience, it is assumed that the first display area 22 has changed to show a metallic display which is one of reflection characteristics of the shutter function. A signal from the outside is received by the transmitting/receiving antenna 53, treated through a receiving circuit 64 shown in FIG. 12, and controling a driving circuit 62 of the liquid crystal display panel by the signal, a display state of the liquid crystal display panel 30 is determined.

A case 1 of the wrist watch is provided with glass 2 and a case back 3 as shown in FIG. 11 and the time-display section includes a printed circuit board 4, a secondary battery 5, a matrix-type liquid crystal display panel 30, and a zebra-rubber connector 38 which connects the liquid crystal display panel 30 and the printed circuit board 4. The time display is performed with a matrix-type liquid crystal display panel 30.

The matrix-type liquid crystal display panel 30 consists of, in order from the glass 2 side, an absorption-type polarizing film as the second polarizing film 14, the liquid crystal cell 39, and a reflection-type polarizing film as the first polarizing film 9. The liquid crystal cell 39 is structured in the same manner as is used in the first embodiment shown in FIG. 5. The liquid crystal 34 which is filled in the liquid crystal cell 39 uses a twisted-nematic (TN) type liquid crystal cell which twists from the first substrate 33 to the second substrate 35 by 90°.

The first polarizing film 9 and the second polarizing film 14 are disposed in a manner that their transmission axes are parallel to each other. Accordingly, when the power supply to the liquid crystal cell 39 is suspended, the liquid crystal display panel 30 can perform a characteristic metallic reflection display because the linearly polarized light which penetrates through the second polarizing film 14 and is twisted by 90° at the liquid crystal cell 39 has a polarizing direction orthogonal to the transmission axis of the first polarizing film 9 so that all of the light is reflected.

A shielding film 37 is provided on the second polarizing film 14 to shield a sealing agent 36 which forms the liquid crystal display panel 30 and a processed end portion. Using a color polarizing film for the shielding film 37 and by providing numerals indicating a time on the color polarizing film, the time-display is realized in colors.

Furthermore, a zebra-rubber connector 38, which consists of a conductive perticle and an insulating material, is utilized to connect the liquid crystal display panel 30 with the printed circuit board 4. An electroluminescent lamp (EL) is used for a supplementary light source 12 used when a wrist watch is used in dark surroundings, and the electroluminescent lamp is connected with the printed circuit board 4 and a terminal 13 for the supplementary light source, in order to make the wrist watch thinner.

On the surface of the EL which is a supplementary light source 12 facing the liquid crystal cell 39, an organic light-storing material is coated. Accordingly, when it becomes dark in the surroundings of the watch, first the organic light-storing material emits light, and then the supplementary light source 12 is turned on, as necessary.

In this embodiment, the supplementary light source 12 and the shutter function of the liquid crystal display panel 30 change the shutter function and the character-display, operating together based on a signal from the outside, which makes the function very attractive especially for young wrist watch users.

Further, the shutter function of the wrist watch performs a curtain-like shutter display which gradually and horizontally moves in the second display areas 54 and 55 within the first display area 22 shown in FIG. 10. The watch has a mode switch 51 to shift the display mode, a switch 52 which performs on-off switching of the supplementary light source and the transmitting, and a control switch 50 which performs the setting of time through a turning action and the control of the shutter function through a push-pull action.

Next, an electric circuit provided in the wrist watch is explained referring to the block diagram in FIG. 12. An electric current is supplied from a battery 5 to each circuit block and a standard pulse generating means (OSC) 60 and a time signal generating means 61 are actuated. A transmitting circuit 63 and a receiving circuit 64 operate by utilizing the standard pulse signal generated by the standard pulse generating means (OSC) 60. The transmitting circuit 63 is actuated by the operation of a control switch 50 shown in FIG. 10, and a signal is supplied to a transmitting/receiving antenna 53 to transmit a signal to the outside.

A signal from the outside is received at the transmitting/receiving antenna 53, detected by the receiving circuit 64, then a control signal is output to a driving circuit 62 of the liquid crystal display panel, and the shutter function of the liquid crystal display panel 30 is controlled thereby.

For instance, a radio wave signal of a specific frequency is detected by a receiving circuit 64 like a pager-watch, and the shutter function of the liquid crystal display panel 30 can be controlled by the detected signal.

In this embodiment, as shown in FIG. 10, the display portions 54 and 55 in the central portion of the watch display a shutter in a scroll-system (a curtain-system) based on a signal from the outside, a message from a sender is displayed by an intermittent on-off of the shutter. For instance, an initial stage corresponds to A, and next to M, corresponds to an opening of the shutter 54, and a "AM" portion in a message "meet at 10:00AM" is shown in an intermittently displaying manner.

In the display section 54 and 55, a film on which visible information (photograph, character, figure, picture, and so on) is formed, can be provided on the opposite side (back side) relative to a viewer, on the first polarizing film (reflection-type polarizing film) 9 which forms the shutter and the liquid crystal cell 39 which is an optical modulation section. Through this structure, the information on the film is sometimes invisible because it is covered with the shutter and sometimes visible because it is not covered by the shutter, which is controlled by the liquid crystal cell 39.

In the watch hereinbefore explained, an embodiment to dispose a film which forms visible information thereon, a color filter, a power-generating element, a supplementary light source and the like on the back side of the liquid crystal display panel 30 is explained. It is also important for improvement in design of the wrist watch to show a mechanical operation section of an analog-type time-display section in which gears are arranged, through the opening portion of the shutter when the shutter function opens and closes. In addition, the movement of the opening portion of the shutter according to the passage of time makes it possible to improve the design of the wrist watch.

In the embodiment, though the application to a wrist watch is explained, it is possible to apply it to a table clock and a wall clock by suitably modifying the size of the display section and the shape of the case 1.

Figure 13:
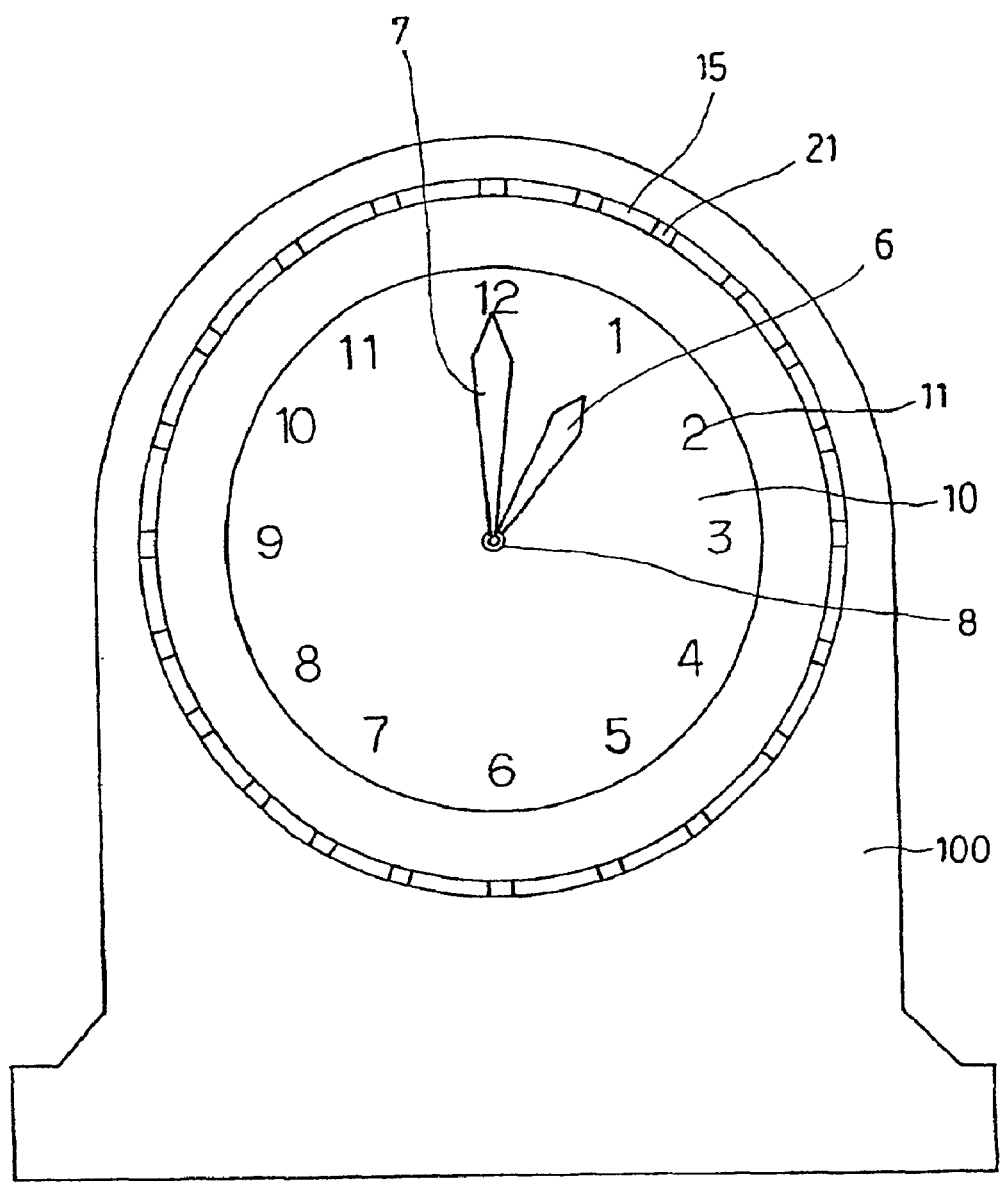
FIG. 13 is a front view of a table clock showing a sixth embodiment of the present invention.

Sixth Embodiment: FIG. 13

Hereinafter, an embodiment applied to a table clock or a wall clock will be explained. First, FIG. 13 shows a table clock which is the sixth embodiment of the present invention.

The clock corresponds to a clock in which the time-display section of the wrist watch in the first embodiment of the present invention shown in FIG. 1 and FIG. 2 is enlarged, the case 1 is formed in a cylindrical shape, then they are fixed in a wooden, a stone, a metal or a resin case 100.

Accordingly, in FIG. 13, a portion corresponding to the portion in FIG. 1 and FIG. 2 is given the same numeral, and the explanation thereof is omitted. An analog display mechanism of the clock and an arrangement and type of the first and the second polarizing films are the same as in the first embodiment. By turning a holding ring 15 for the polarizing film, the display of the time-display section changes to a full-mirror state or a transparent state so that the time information by an hour hand 6 and a minute hand 7 becomes visible.

Figure 14:
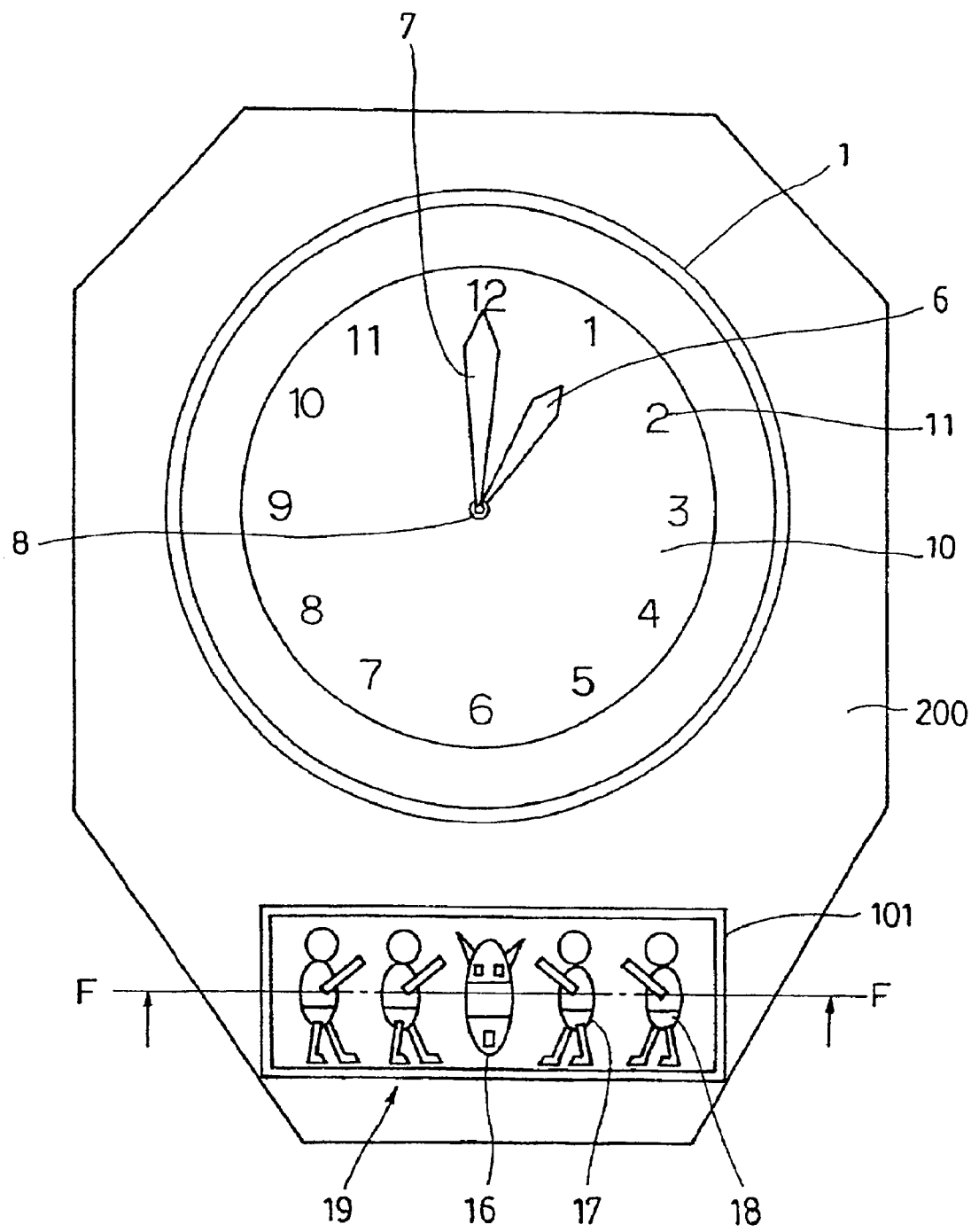
FIG. 14 is a front view of a wall clock showing a seventh embodiment of the present invention.
Figure 15:
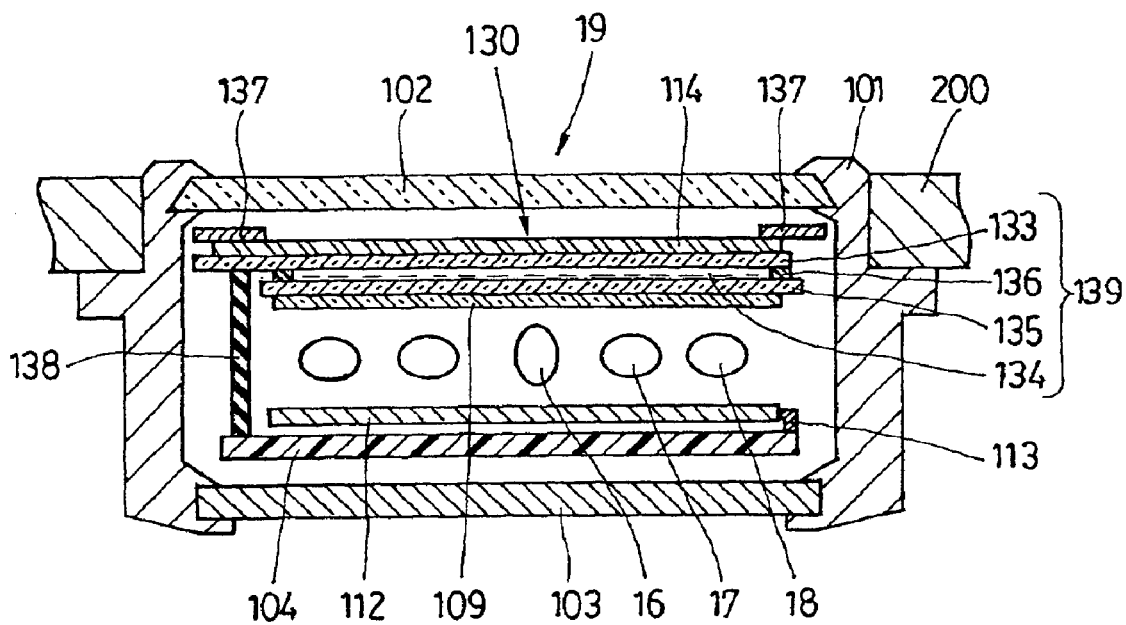
FIG. 15 is a schematic sectional view taken along the line F—F in FIG. 14.

Seventh Embodiment: FIG. 14 and FIG. 15

Next, the seventh embodiment of the present invention will be explained with reference to FIG. 14 and FIG. 15.

This embodiment is an application of the present invention to a wall clock, and its time-display section is structured in the same manner as in the watch of the third embodiment explained with reference to FIG. 8 and FIG. 9.

On the lower side of the time-display section, a marionette unit 19 having marionettes 16, 17 and 18 (5 pieces) is provided. A shutter function of the marionette unit 19 is performed by an interplay of a polarizing film and a liquid crystal cell.

FIG. 14 is a front view of the clock, and FIG. 15 is a schematic sectional view taken along the line F—F in FIG. 14.

In this clock, a case 1 for the clock unit and a case 101 for the marionette unit 19 are fixed in a case 200 which is made of wood or the like.

The marionette unit 19 is sealed in a case 101 attached with glass 102 and a case back 103 as shown in FIG. 15.

In the interior thereof, 5 pieces of the marionettes 16, 17, 18 and the motion mechanism (not shown) are installed so that dust and the like are prevented from entering the interior and preventing the marionettes 16, 17, and 18 from being stained.

Between the glass 102 and the marionettes 16, 17, and 18, from the glass 102 side, a high transmittance absorption-type polarizing film as a second polarizing film 114, a liquid crystal cell 139, and a liquid crystal display panel 130 consisting of a reflection-type polarizing film as a first polarizing film 109 are arranged.

The liquid crystal cell 139 is a twisted nematic type liquid crystal cell having a twist angle of 90° and is structured such that a first substrate 133 and a second substrate 135 which form a transparent electrode on each confronting surface thereof are bonded through a sealing agent 136, and liquid crystal 134 is filled in the gap between the above substrates.

For the reflection-type polarizing film as the first polarizing film 109, an optical film such as DBEF (trade name) sold by Sumitomo 3M Co., Ltd. is used.

The first polarizing film (a reflection-type polarizing film) 109 and the second polarizing film (a absorption-type polarizing film) 114 are disposed so that their transmission axes are arranged nearly parallel to each other.

Between the marionettes 16, 17, 18 and the case back 103, a supplementary light source 112 to illuminate the marionettes 16, 17, and 18 when the circumstances surrounding the clock in use is dark, and a printed circuit board 104 to drive-control the operation mechanism of the liquid crystal panel 130 and the marionettes 16, 17 and 18, are arranged.

For the supplementary light source 112, an array which disposes red, blue, and green light-emitting diodes (LED) in plane is adopted, laying emphasis on the color tone and variety of colors. The liquid crystal display panel 130 and the printed circuit board 104 are connected with a zebra-rubber connector 138.

On the viewer side of the liquid crystal display panel 130, a shielding film 137 is provided to improve the stage effects of the marionettes 16, 17, and 18. By providing a something dark violet or gold hued material as the shielding film 137, a high-quality image of the marionettes 16, 17 and 18 is enhanced.

The liquid crystal display panel 130 used in the seventh embodiment is divided into five because it has a shutter function to shield each doll of the marionettes 16, 17 and 18 (five pieces of dolls) in the marionette unit 19. Each portion is electrically controllable by a signal from the printed circuit board 104, respectively. For instance, only right side marionettes 16, 17, and 18 can be shielded in FIG. 14. Alternatively, the shielded potion can be easily shifted from the right marionette to the left marionette (or from the left to the right) at certain time intervals.

In this embodiment, the clock has a shutter function with a metallic luster owing to the reflection-type polarizing film of the first polarizing film 109.

Thus, in this embodiment, an electronic shutter having a metallic reflection characteristic and transmission characteristic through the liquid crystal display panel 130 can be provided on the viewer side of the marionettes 16, 17, 18 in the marionette unit 19. Since it is an electronic shutter, the shielding section and the transmitting section of the shutter can be easily varied in accordance with the movement of the marionettes 16, 17 and 18, and the control of the luminescent color of the supplementary light source 12 and the control of the opening and closing of the shutter on time can be also possible, so that stage management of the marionettes 16, 17 and 18 can be varied.

Figure 16:
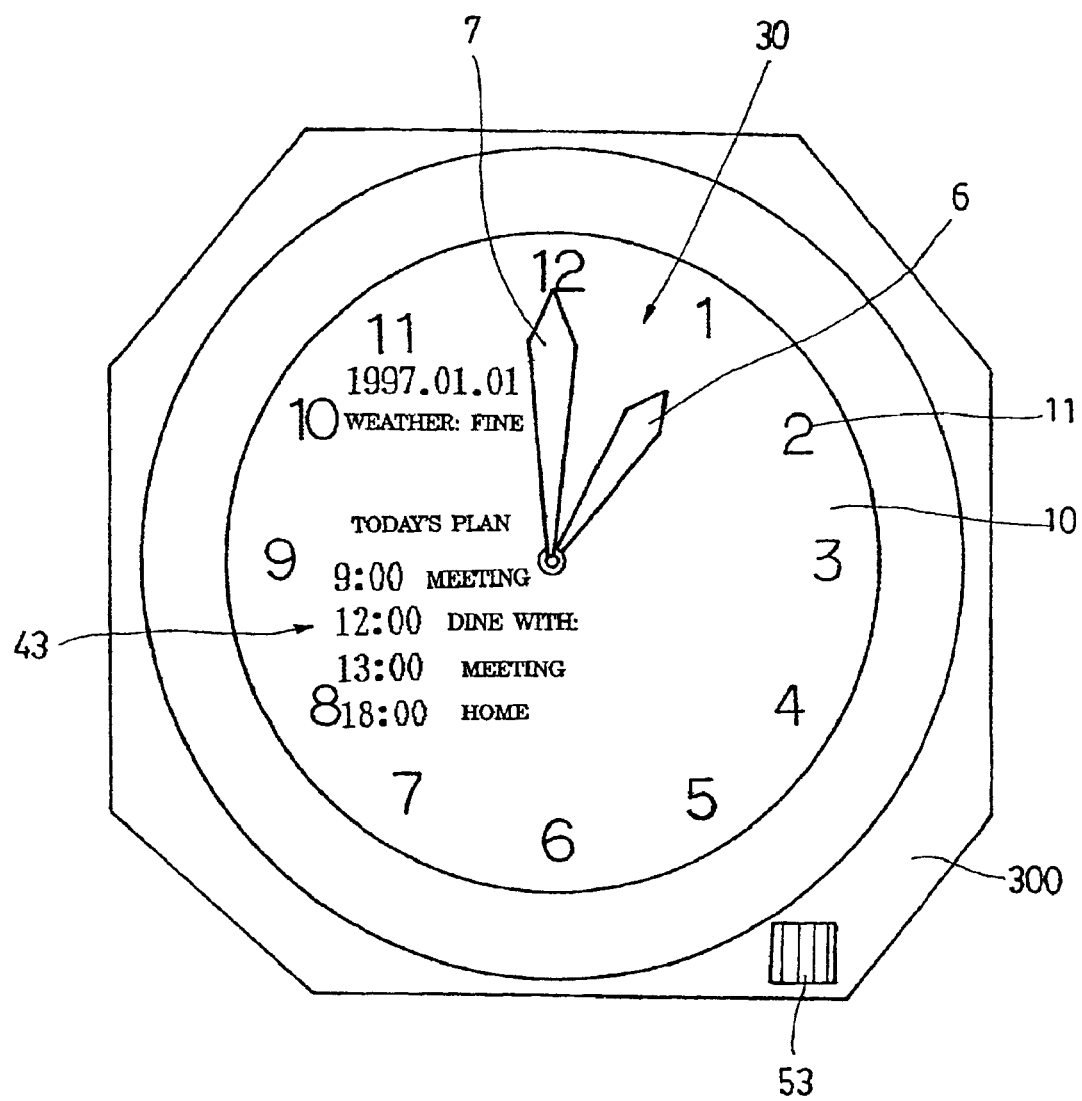
FIG. 16 is a front view of a wall clock showing an eighth embodiment of the present invention.

Eighth Embodiment: FIG. 16

Next, FIG. 16 is a front view of a wall clock showing the eighth embodiment of the present invention.

This wall clock is provided with a liquid crystal display panel 30 in which a lower-side polarizing film is a reflection-type polarizing film provided between a glass front and an analog-display-type time-display section consisting of a hour hand 6, a second hand 7, and the dial 10, similar to that in the third embodiment shown in FIG. 8 and FIG. 9. The above clock unit is fixed in a case 300.

The liquid crystal display panel 30 is equipped with a character-display section 43 which displays characters such as a schedule and the like on the time-display section.

A transmitting/receiving antenna 53 is provided on a portion of the surface of the case 300, a circuit similar to that shown in FIG. 12 detects a signal having a specific frequency from the outside, and the liquid crystal display panel 30 is controlled based on the detected signal so as to optionally vary the reflection or transmission state of the time-display surface.

INDUSTRIAL APPLICABILITY

As explained above, according to the present invention, by disposing a reflection-type polarizing film on the front side or the back side of a time-display section of a timepiece or at least on a portion of the time-display section, a display utilizing metallic reflection characteristics and transmission characteristics having a broad variety can be realized and the improvement of the design of the timepiece and the development of an innovative design become possible.

A shutter function which is electrically controllable to the time-display section of a timepiece can be provided. A portion or all of the display of the liquid crystal display panel can be contributed to the opening and closing of a shutter and by utilizing a shape of an electrode pattern of the liquid crystal display panel or a matrix-type liquid crystal display panel, the function of a fan shape, a concentric circle shape shutter, or a flashing-type shutter and the flexibility thereof are widened so that the display appearance of a timepiece can be improved.

A liquid crystal display panel utilizing a reflection-type polarizing film can be applied to a shutter provided on the viewer side of a marionette which is equipped in a wall clock for decorative purpose or for adding value, so that it contributes to making the value of the clock higher.

Furthermore, as a result of enriching a shutter function by adopting an optical modulation section having a reflection-type polarizing film for a watch equipped with a power-generating element, it is possible to display a power-generating condition of a power-generating element, a state of the amount of the electricity accumulation, and to manage treatment after suspension of a wrist watch due to the exhaustion of the accumulated electricity, working together with the shutter function. Particularly, when an optical modulation section is disposed nearer to the glass side than to the time-display section, erroneous recognition of the time-display section due to full-closing of the shutter can be prevented.

Additionally, by providing a color filter, a color film, and a color polarizing film on a portion of a reflection-type polarizing film or on the case back side, a colorful shutter can be realized.

What is claimed is:

1. A timepiece with power generation function, comprising:
    a reflection-type polarizing film which has a transmission axis and a reflection axis intersecting with the transmission axis at right angles, and a function of transmitting light linearly polarized in the direction parallel to the transmission axis but which reflects light linearly polarized in a direction parallel to the reflection axis;
    an optical modulation section for modulating transmission of light, overlapping with said reflection-type polarizing film; and
    a solar cell disposed on a back side of said reflection-type polarizing film and said optical modulation section.

2. The timepiece with power generation function according to claim 1, wherein said optical modulation unit comprises a liquid crystal panel, and said liquid crystal panel has a display area for displaying an amount of generated electricity of said solar cell or an amount of accumulated electricity.

3. The timepiece with power generation function according to claim 2, wherein said optical modulation section controls said display area in accordance with the amount of generated electricity of said solar cell or the amount of accumulated electricity.

4. The timepiece with power generation function according to claim 2, wherein said display area comprises a reflection area and a transmission area, and said optical modulation section varies an area ratio between said reflection area and said transmission area in accordance with the amount of generated electricity of said solar cell or the amount of accumulated electricity.

5. The timepiece with power generation function according to claim 1, wherein said optical modulation section varies a light incident on said solar cell by varying a ratio between incident light on the transmission axis of said reflection-type polarizing film and on the reflection axis thereof.

6. The timepiece with power generation function according to claim 1, wherein said optical modulation section varies reflection intensity and transmission intensity of said reflection-type polarizing film in accordance with an amount of generated electricity of said solar cell or an amount of accumulated electricity.

7. The timepiece with power generation function according to claim 2, wherein said display area is placed on a front side of said solar cell, and a light receiving condition of said solar cell is varied due to change in said display area caused by said optical modulation section.

8. The timepiece with power generation function according to claim 7, wherein said optical modulation section performs control such that transmittance of said display area becomes larger as an amount of generated electricity of said solar cell or an amount of accumulated electricity becomes smaller, and thereby intensifying light incident on said solar cell.

9. The timepiece with power generation function according to claim 2, wherein said reflection-type polarizing film is disposed on a back side of said liquid crystal panel.

* * * * *